United States Patent
Southman et al.

[19]

[11] Patent Number: 6,031,745
[45] Date of Patent: Feb. 29, 2000

[54] TIME MULTIPLEXED POWER SUPPLY

[75] Inventors: Gordon R. Southman, Grass Valley; Patrick H. Dwyer, Penn Valley, both of Calif.

[73] Assignee: Aim Controls, Inc., Penn Valley, Calif.

[21] Appl. No.: 09/091,088

[22] PCT Filed: Oct. 10, 1997

[86] PCT No.: PCT/US97/19015

§ 371 Date: Jun. 11, 1998

§ 102(e) Date: Jun. 11, 1998

[87] PCT Pub. No.: WO98/16983

PCT Pub. Date: Apr. 23, 1998

Related U.S. Application Data

[60] Provisional application No. 60/028,271, Oct. 11, 1996.

[51] Int. Cl.[7] .................................................. H02M 7/08
[52] U.S. Cl. ................... 363/70; 363/89; 363/126
[58] Field of Search .................... 363/67, 69, 70, 363/84, 89, 126

[56] References Cited

U.S. PATENT DOCUMENTS

| | | | |
|---|---|---|---|
| 3,663,825 | 5/1972 | Low et al. | 363/70 |
| 4,845,637 | 7/1989 | Basarath et al. | 363/70 |
| 4,847,742 | 7/1989 | Ohashi et al. | 363/70 |
| 4,956,762 | 9/1990 | Loveness et al. | 363/70 |
| 5,045,712 | 9/1991 | Baggenstoss | 363/41 |
| 5,267,137 | 11/1993 | Goebel | 363/69 |
| 5,659,208 | 8/1997 | Kimble et al. | 363/65 |
| 5,682,303 | 10/1997 | Goad | 363/71 |

*Primary Examiner*—Jeffrey Sterrett
*Attorney, Agent, or Firm*—John P. O'Banion

[57] ABSTRACT

A variable voltage power supply in which multiple, independent, variable voltage direct current power supply circuits are connected in parallel to a single secondary transformer winding without simultaneously loading the transformer secondary. Each power supply circuit is controlled by a logic circuit that gates a power FET which, in turn, delivers current to a storage capacitor from a full wave rectifier on the transformer secondary winding. By controlling when the FET is "on" in relation to the AC input waveform, the voltage to which the storage capacitor is charged can be regulated and simultaneous loading of the transformer secondary eliminated.

12 Claims, 10 Drawing Sheets

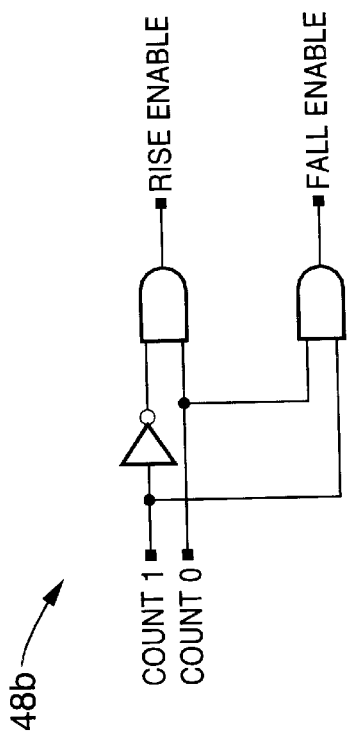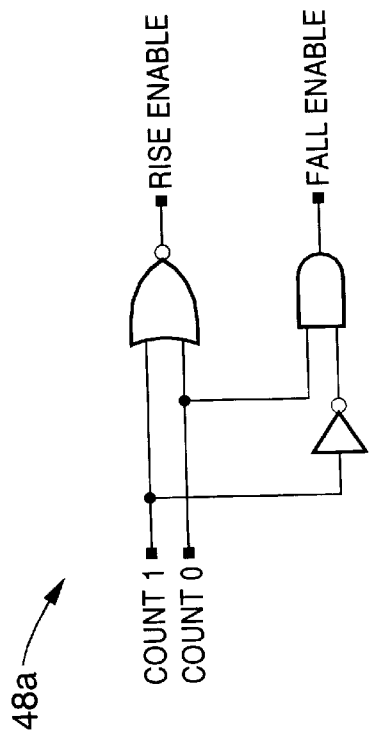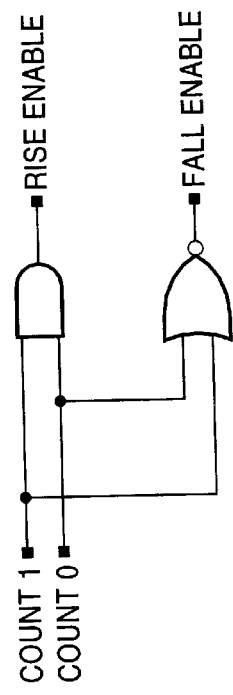
FIG. 7a
FIG. 7b
FIG. 7c

TIME MULTIPLEXED POWER SUPPLY This application claims priority from U.S. Pat. Ser. No. 60/028,271 filed on Oct. 11, 1996, which is incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to electrical power supply circuitry, and more particularly to a method and apparatus for obtaining multiple, independent, variable voltage power supplies from a single secondary transformer winding.

2. Description of the Background Art

There exists situations wherein two or more independently variable voltage DC power supplies are required; for example, the operation of multiple direct current devices such as DC servo motors or DC stepper motors in motion control and robotic applications. While it is possible to link together multiple linear power supplies or multiple switching power supplies under a common control system, there are a number of problems with doing so, including: (i) it is difficult and expensive to link together, in a coordinated manner, the control of such power supply combinations; and (ii) both types of such power supplies require numerous components that take up a large amount of physical space and are costly to build. Since physical transformers are not ideal devices, an increase in current draw will cause a lowering of the output voltage on the secondary winding (and on any other secondaries that may be on the same transformer). The result is that the power supply output capacitors may not get the desired amount of current and voltage (i.e. there is excessive voltage sag on the transformer), and instabilities can arise as the various instances attempt to compensate by drawing even more current on subsequent cycles.

BRIEF SUMMARY OF THE INVENTION

The present invention overcomes such deficiencies by allowing multiple, independent, variable voltage power supplies to be connected in parallel to a single secondary transformer winding without simultaneously loading the transformer secondary. Each voltage supply circuit is controlled by a logic circuit that gates a power FET which, in turn, delivers current to a storage capacitor from a full wave rectifier on the transformer secondary winding. By controlling when the FET is "on" in relation to the AC waveform, the voltage to which the storage capacitor is charged can be regulated. This provides a controllable, variable voltage supply from the storage capacitor. By coordinating the timing of the FETs in several of these circuits, they can share a single transformer secondary winding without adversely affecting the regulation of the output of the other secondary voltage circuits. Moreover, the total amperage drawn on the transformer at a given point in time is substantially reduced. Consequently, the size of the transformer can be considerably smaller than if all the variable voltage supply circuits were drawing current simultaneously.

An object of the invention is to operate multiple, direct current, variable voltage power supplies independently from a single transformer secondary winding.

Another object of the invention is to operate multiple, direct current, variable voltage power supplies independently from a single transformer secondary winding without simultaneously loading the transformer secondary.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 7A through 7C are diagrams of share logic control circuitry employed in the power supply shown in FIG. 2.

DETAILED DESCRIPTION OF THE INVENTION

Referring more specifically to the drawings, for illustrative purposes the present invention is embodied in the apparatus generally shown and described in FIG. 1 through FIG. 10 where like reference numbers denote like parts. It will be appreciated that the apparatus may vary as to configuration and as to details of the parts without departing from the basic concepts as disclosed herein.

1. Voltage Control.

The output of a full-wave rectified but unfiltered transformer secondary winding is a voltage that varies in a regular pattern between zero volts and the maximum voltage defined by the ratio of the transformer primary and secondary windings and the primary input voltage. If the rectified transformer secondary voltage is connected to a capacitor at or near the time the voltage is zero, the capacitor will begin charging whenever the voltage from the transformer secondary exceeds the voltage to which the capacitor is currently charged. If, after this charging has begun, the rectified voltage is disconnected before reaching its maximum, the voltage on the capacitor will be equal to the voltage present before disconnection. Hence, the voltage at the capacitor will be less than the maximum possible. Since a load will tend to discharge the capacitor, repeating the process regularly will keep the capacitor charged to a relatively constant voltage. In this regard, also note that a full-wave rectifier on the output of a transformer secondary winding which is not filtered has the effect of doubling the AC input frequency at the output. For example, if the frequency of the AC input signal is 60 Hz, the output will be a 120 Hz wave that varies from zero to maximum voltage (commonly known as unfiltered DC).

Similarly, if the rectified voltage is connected to the capacitor after the voltage has passed the maximum, but before it reaches zero, the capacitor will be charged to the voltage that is present when the connection is made. The voltage can then be disconnected any time before the voltage rises above this level, and the capacitor will remain at such voltage level.

Figure 1:
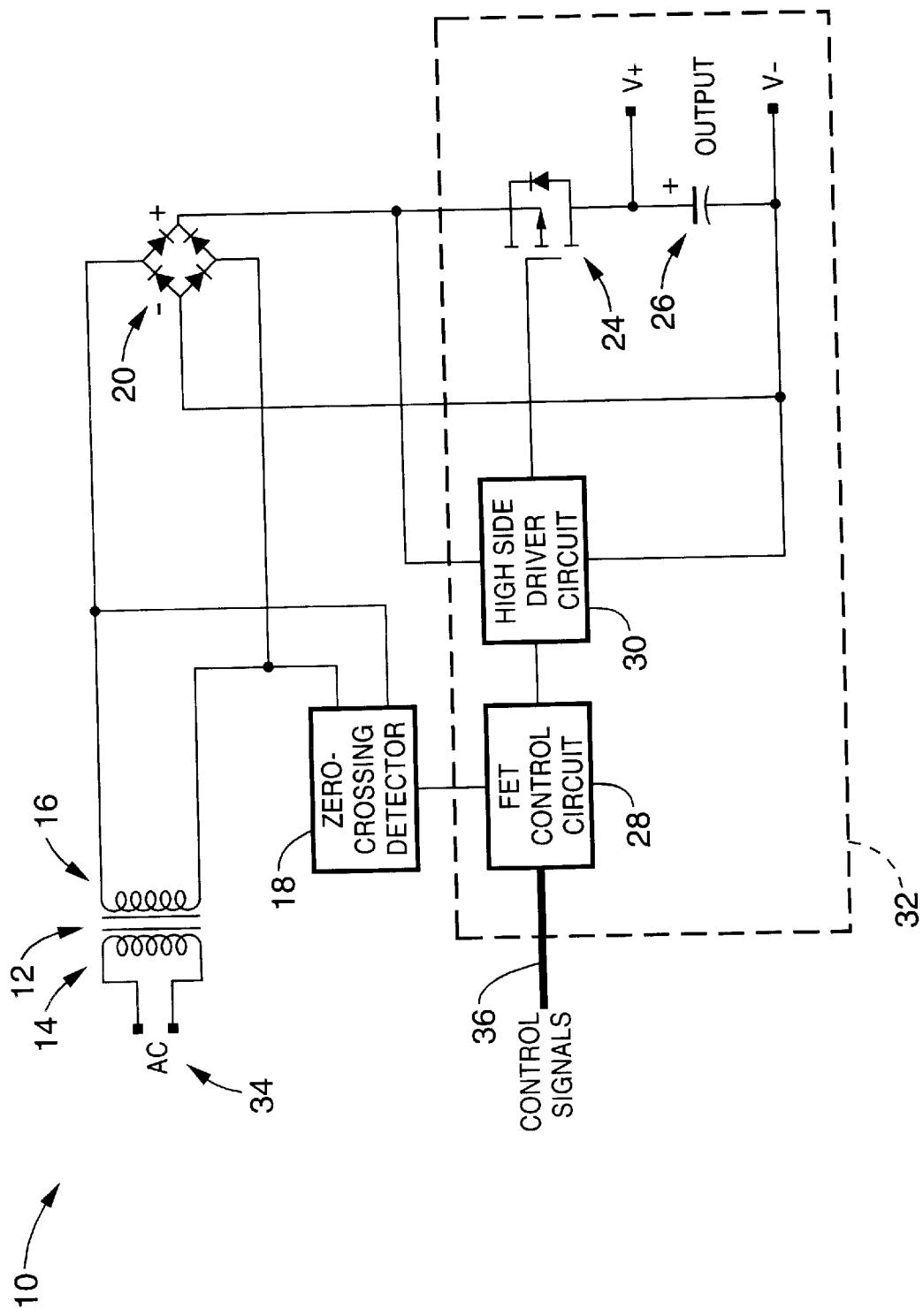
FIG. 1 is a diagram of a single variable voltage direct current power supply in accordance with the present invention connected to a transformer with a bridge rectifier.

Referring first to FIG. 1, a variable voltage power supply 10 in accordance with the invention is generally shown. Power supply 10 includes a transformer 12 having a primary winding 14 and a secondary winding 16, a zero crossing detector 18, a bridge rectifier 20, an FET 24, an output capacitor 26, an FET control circuit 28 and a high side driver circuit 30. FET 24 serves as a switch which controls the connection and disconnection of the rectified voltage to capacitor 26. It will be appreciated that a different type of transistor (e.g. BJT, IGBT, etc.), or another type of semiconductor (e.g. GTO thyristor, etc.), or a mechanical or electronic relay, or other device could alternately be used if the switching characteristics of such device are suitable. The combination of FET 24, FET control circuit 28, and high side driver circuit 30 form a variable voltage supply circuit 32.

Since the cycle time of the AC primary voltage 34 to transformer 12 is constant for modem distribution systems (60 Hz in North America and 50 Hz in most other countries), there is a fixed relationship between the voltage and time. Therefore, if the length of time that has elapsed since the voltage of the transformer secondary 16 was last zero, as detected by zero crossing detector 18, is known, then the voltage present at capacitor 26 is known. By accurately referencing timers to the secondary winding zero voltage condition through control signals 36, the elapsed time can be used to accurately control the "on" period of the FET 24, and thus control the voltage across capacitor 26.

2. Cycle Sharing.

If several instances of the post transformer circuitry in FIG. 1 are connected in parallel to a single transformer secondary winding, such as to secondary winding 16, there will be occasions where two or more of those circuits are attempting to draw current from the transformer simultaneously. Since physical transformers are not ideal devices, an increase in current draw will cause a lowering of the output voltage on the secondary winding (and on any other secondaries that may be on the same transformer). The result is that the output capacitors may not get the desired amount of current and voltage (i.e. there is excessive voltage sag on the transformer), and instabilities can arise as the various instances attempt to compensate by drawing even more current on subsequent cycles (experience has shown that this is particularly severe in cases of three or more secondary circuits). To alleviate this instability, the invention employs a control mechanism which allows each individual variable voltage supply circuit to draw current on specified cycles so that only one power supply circuit is drawing current from the transformer secondary at any given time.

Referring now to FIG. 2 through FIG. 6, an example of a variable voltage power supply with secondary winding time multiplexing in accordance with the invention is shown. Here, three instances of the post-transformer circuitry of FIG. 1 are powered by the same secondary winding. Those skilled in the art will appreciate that systems could similarly be constructed for any number of instances connected to the secondary winding.

Figure 2:
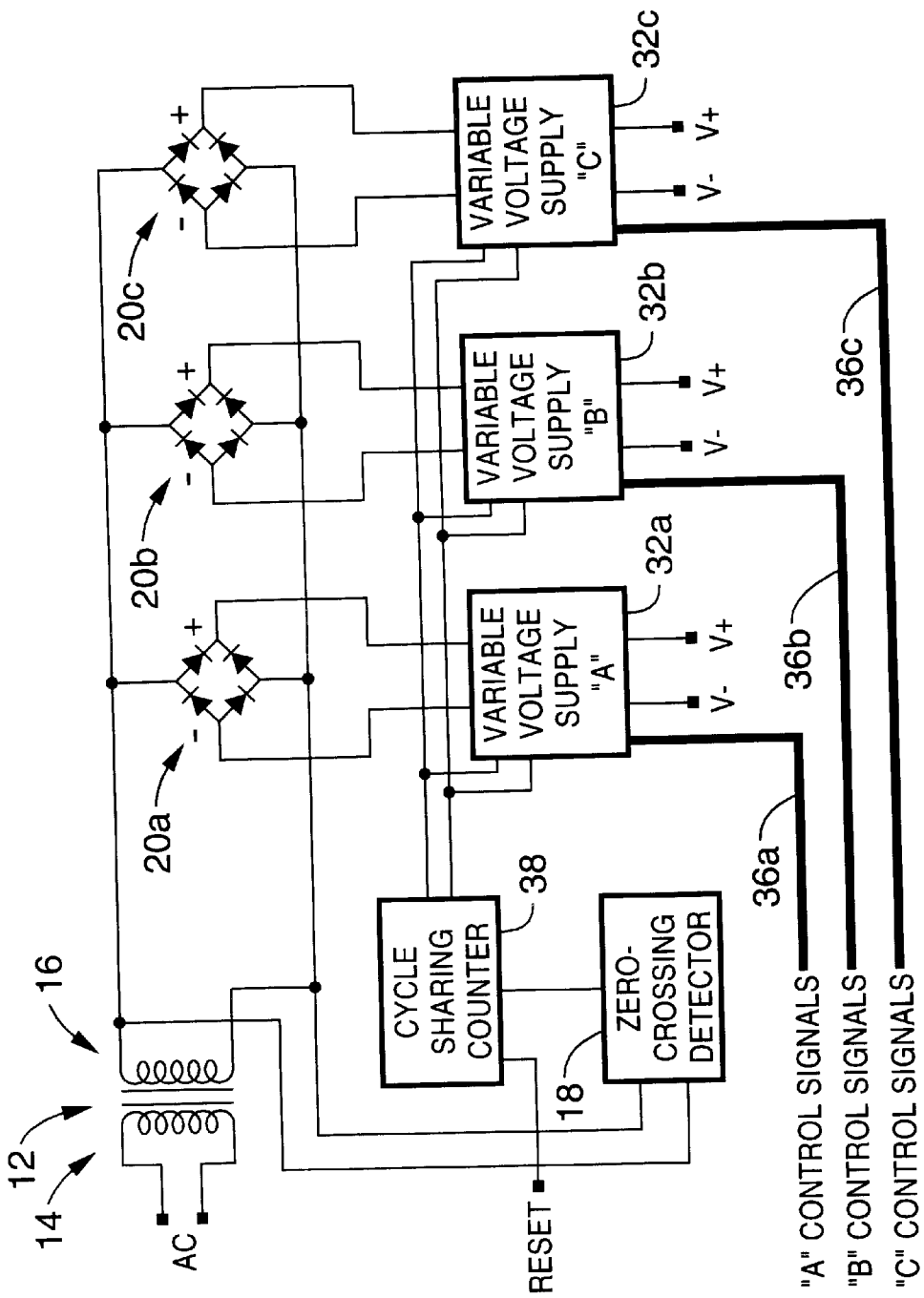
FIG. 2 is a diagram of a plurality of variable voltage direct current power supplies as shown in FIG. 1 connected in parallel to the secondary of the transformer and to time multiplexing circuitry in accordance with the present invention.
Figure 3:
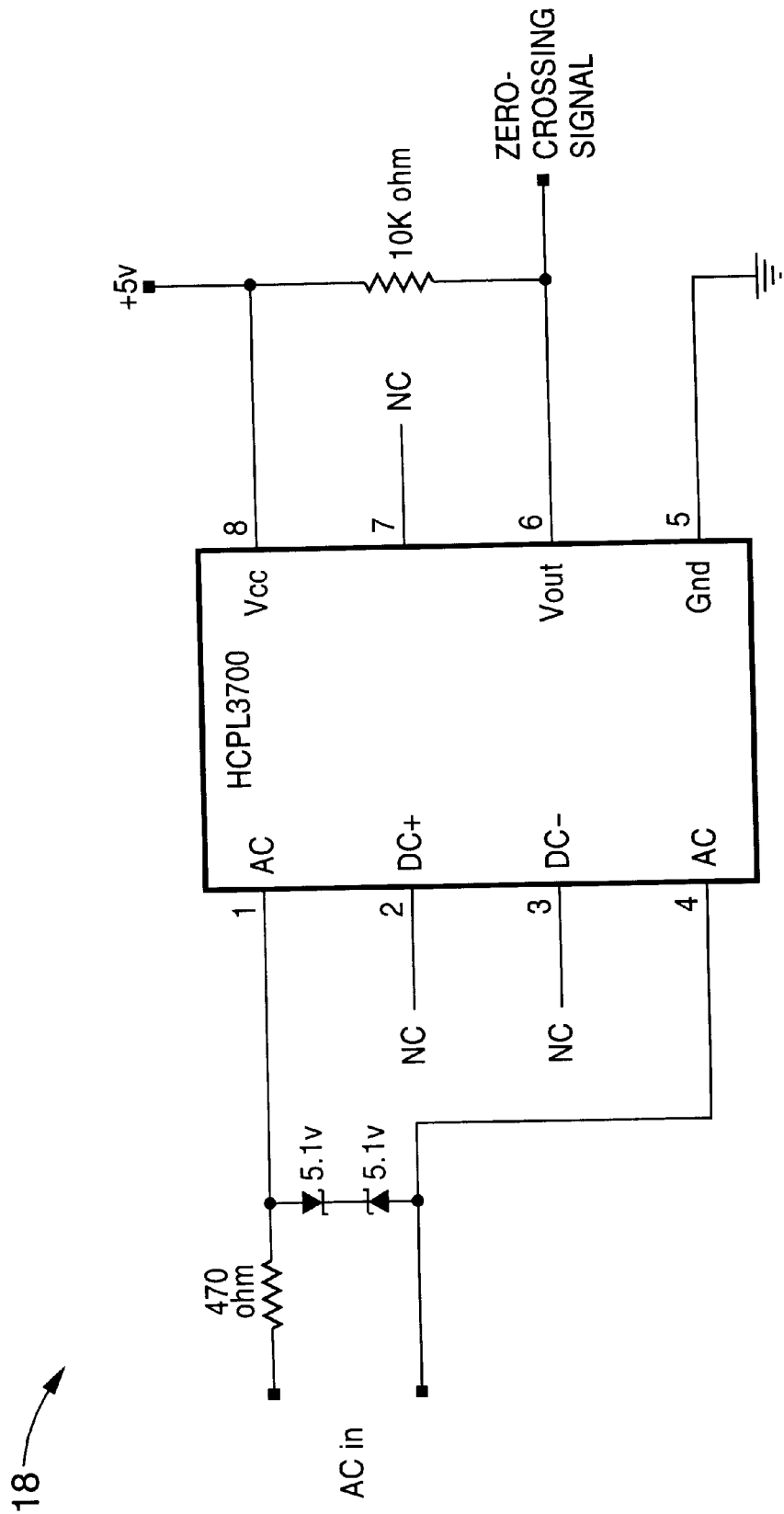
FIG. 3 is a diagram of a zero crossing detector employed in the present invention.
Figure 4:
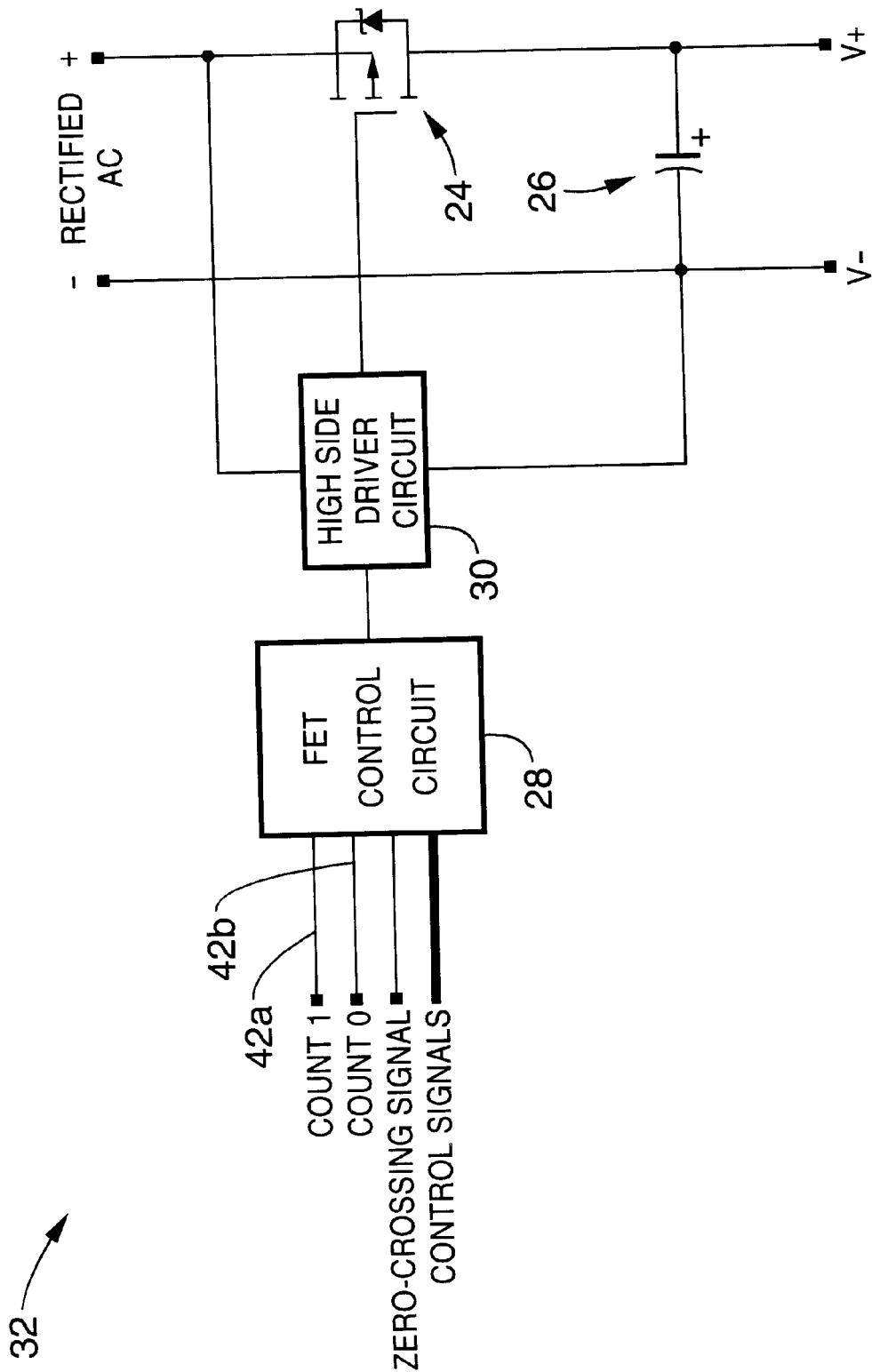
FIG. 4 is a diagram of a variable voltage power supply circuit employed in the present invention.
Figure 5:
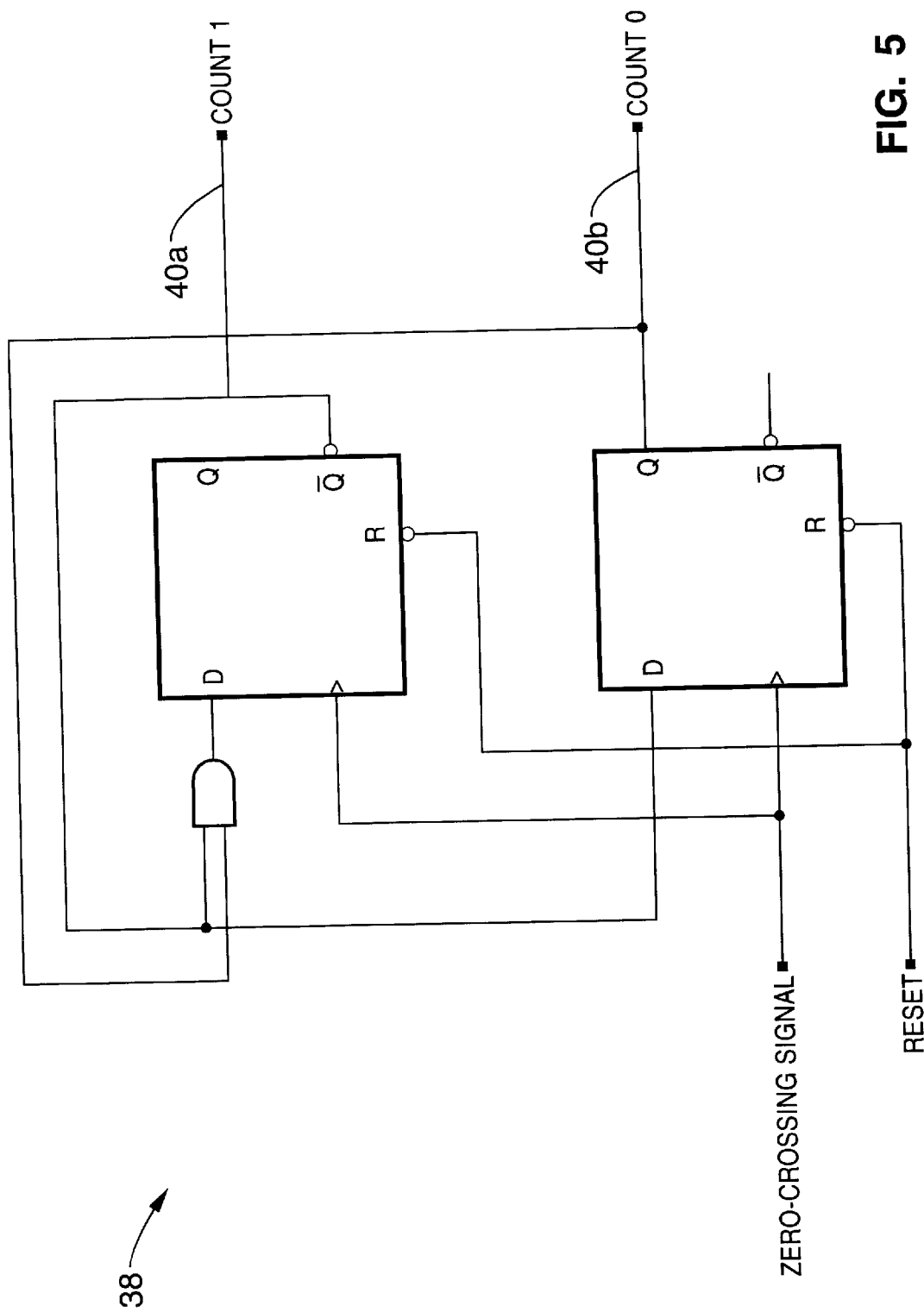
FIG. 5 is a diagram of a cycle sharing counter employed in the present invention.
Figure 6:
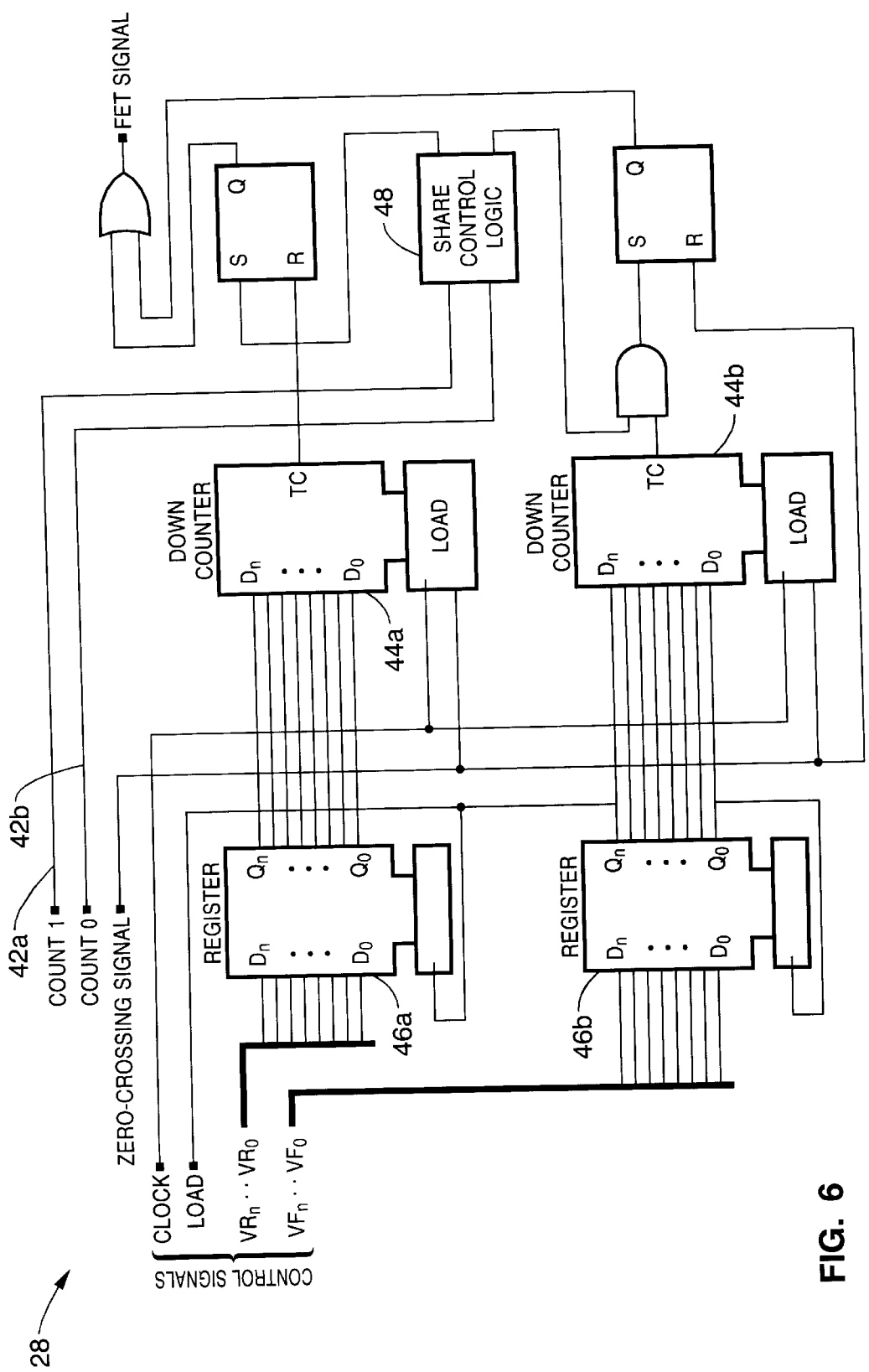
FIG. 6 is a diagram of a FET control circuit employed in the present invention.

As shown in FIG. 2, a three-instance time multiplexed variable voltage power supply in accordance with the invention includes transformer 12 having primary winding 14 and secondary winding 16, three bridge rectifiers 20a, 20b, 20c, three variable voltage supply circuits 32a, 32b, 32c that are controlled by control signals 36a, 36b, 36c, respectively, a cycle sharing counter 38 and zero crossing detector 18. FIG. 3 shows an exemplary schematic diagram for zero crossing detector 18 using a commercially available HCPL3700 and common discrete components, FIG. 4 shows a functional block diagram and partial schematic for a variable voltage supply circuit 32, FIG. 5 shows a schematic diagram of cycle sharing counter 38 using conventional D-flip flops and logic gates, and FIG. 6 shows a schematic diagram of FET control circuit 28 using conventional registers, down counters and logic gates. Those skilled in the art will appreciate that the components (or their finctional equivalents) shown with symbols, labels and values are conventional, commercially available components.

Figure 8:
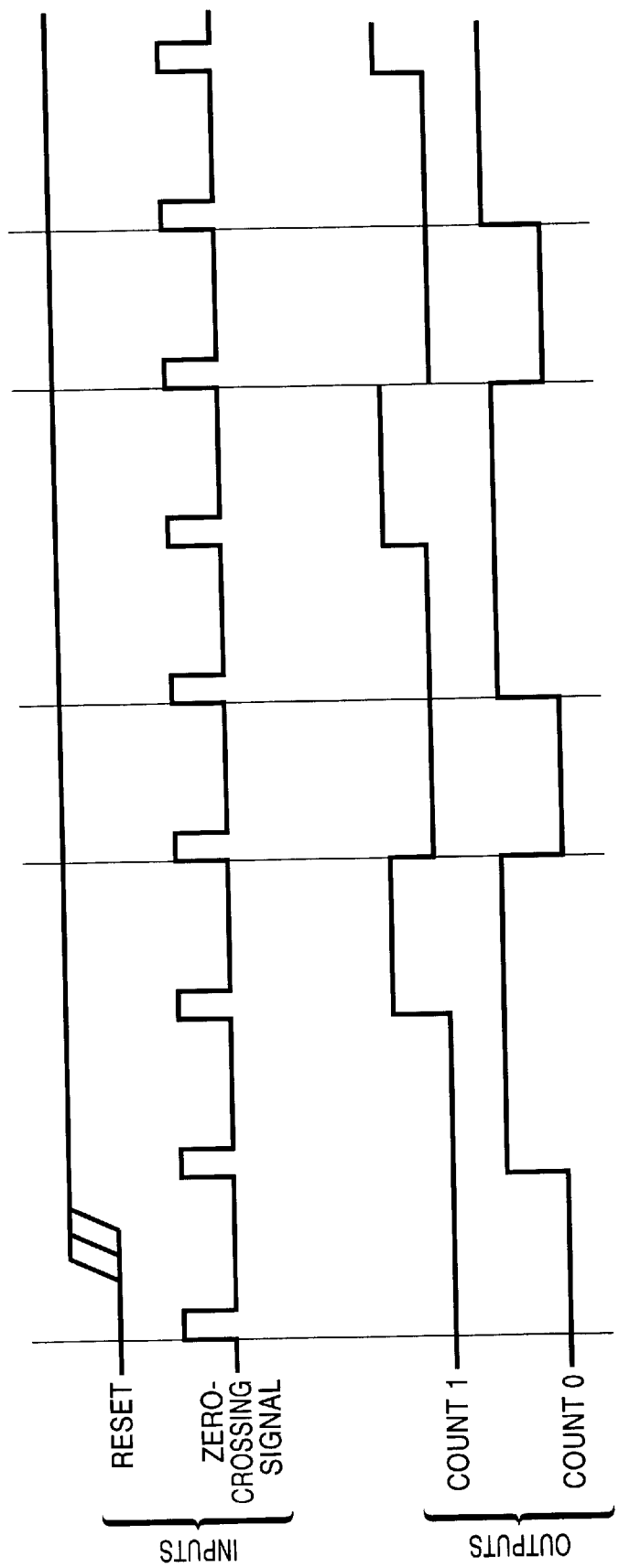
FIG. 8 shows exemplary waveforms for the cycle sharing counter shown in FIG. 5.

Referring to FIG. 5, cycle sharing counter 38 endlessly repeats the output sequence: 00, 01, 11, 00, 01, 11, 00, ... at count outputs 40a, 40b which are used as inputs 42a, 42b for FET control circuit 28, respectively. Other sequences could be used with appropriate modification of the cycle sharing logic. In a system using a different number of independent supply circuits, another count sequence with the appropriate number of states would be required (i.e. 0, 1, 0, 1, ... for two circuits, 000, 001, 011, 110, 100, 000, 001, ... or similar for five circuits, etc.). Exemplary waveforms for cycle sharing counter 38 are shown in FIG. 8.

Referring to FIG. 6, each FET control circuit 28 includes two down counters 44a, 44b, two reload holding registers 46a, 46b which are supplied with the appropriate count values from an external source such as a microprocessor (not shown), and a unique set of share control logic 48. FIG. 7A through FIG. 7C show three schematics for the share control logic 48a, 48b, 48c appropriate to each of the three variable voltage supply circuits 32a, 32b, 32c, respectively. By using different share control logic circuitry 48, 48b, 48c for each instance of variable voltage supply circuitry 32a, 32b, 32c, respectively, the "rise timer", and "fall timer" outputs of the FET control circuits in the variable voltage supply circuits are enabled strictly at separate intervals. This guarantees that only one circuit is drawing current from the transformer at any time. The result is waveforms such as shown in FIG. 9.

Figure 9:
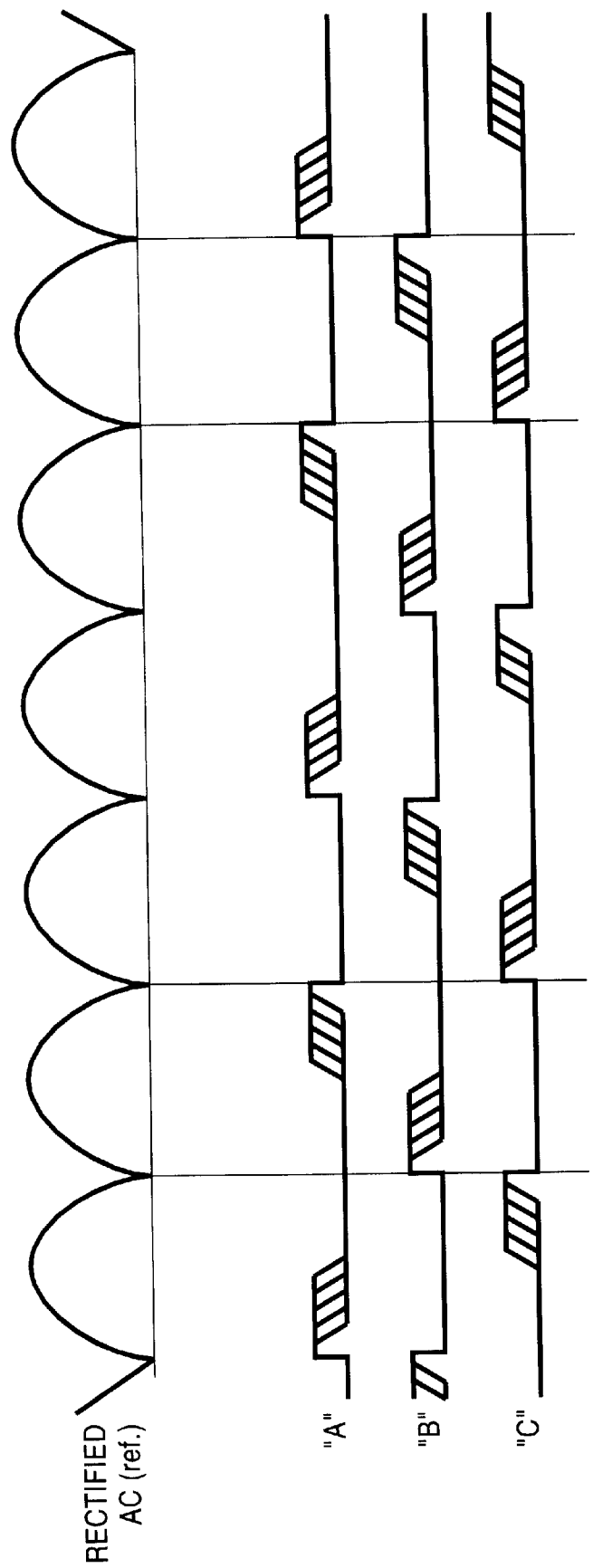
FIG. 9 shows exemplary waveforms for the outputs of the FET's shown in FIG. 2.

In FIG. 9, the multiple diagonal lines in the waveform are meant to represent the variable width of the pulse based upon the respective timer value. Note that, within each output waveform, the pulses alternate between "rise times" and "fall times". Rise times always start at a zero crossing and end at some variable time later. Fall times always end at a zero crossing and begin at some variable time earlier.

Figure 10:
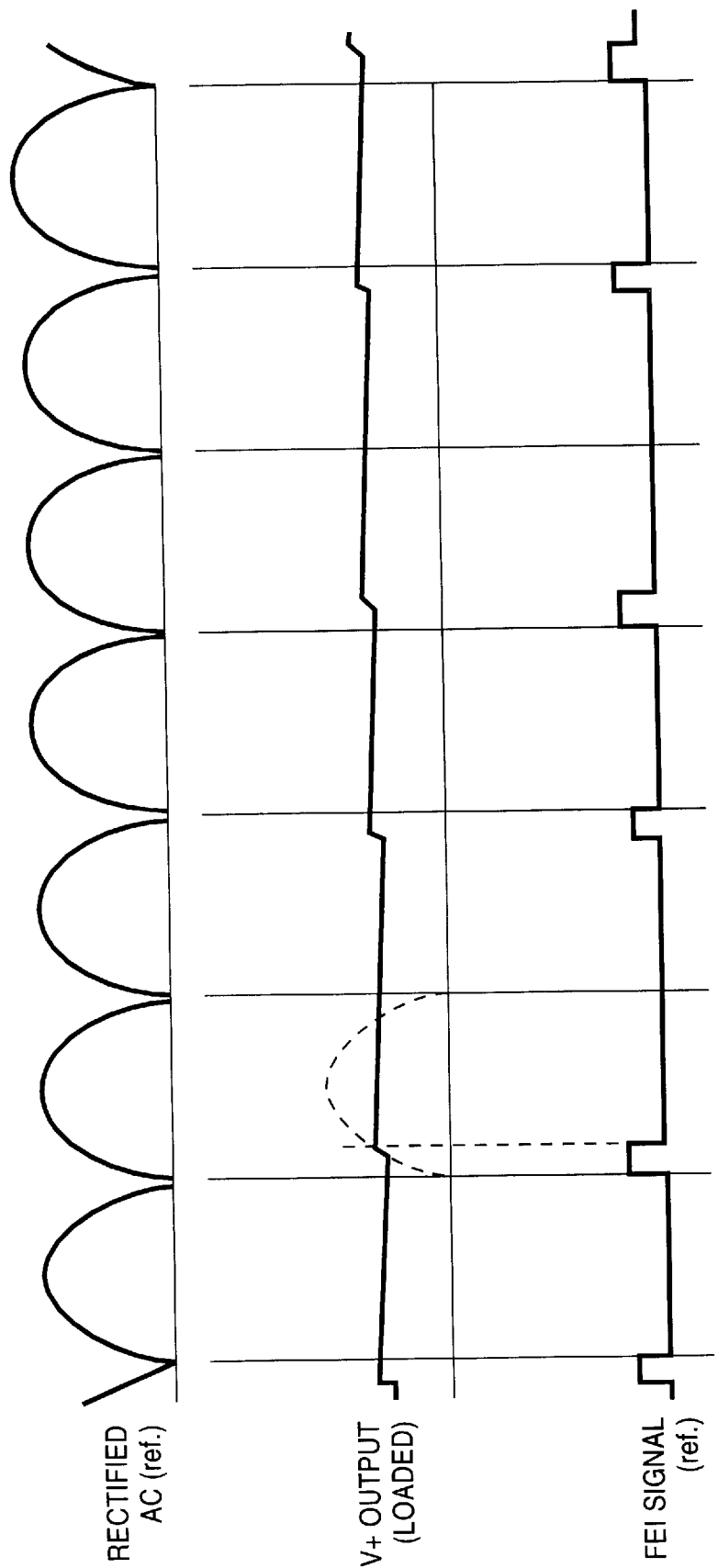
FIG. 10 shows an example output waveform showing an output voltage which is slightly more than one half of the maximum.

FIG. 10 shows an example output waveform showing an output voltage which is slightly more than one half of the maximum. The width of the FET_Signal pulses required to achieve this output is also shown. Wider pulses would increase the output voltage (up to the maximum as determined by the transformer). Narrower pulses would result in a lower output voltage.

Accordingly, it will be seen that this invention allows for multiple DC power supplies to be connected to a single transformer secondary winding without simultaneously loading the transformer secondary. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A time multiplexed power supply, comprising:
   (a) a transformer having a primary and a secondary;
   (b) a full wave bridge rectifier without any filter placed across the secondary of the transformer that creates an electrical power pulse train with a frequency of twice the frequency of the primary voltage:
   (c) a plurality of direct current power supply circuits having inputs connected in parallel to said full wave rectified transformer secondary;
   (d) means for time multiplexing power flow from said full wave rectified transformer secondary to said power supply circuits.

2. A power supply as recited in claim 1, wherein said time multiplexing means converts the energy from said full wave rectified electrical pulse train into multiple, independent, variable voltage direct current power supplies.

3. A power supply as recited in claim 1, wherein said time multiplexing means includes means for sharing full wave rectified, sinusoidal energy pulses from said transformer secondary amongst said power supply circuits.

4. A power supply as recited in claim 1, wherein said power supply circuits are independently variable voltage direct current power supply circuits.

5. A power supply as recited in claim 1, wherein said power supply circuits draw current on specified cycles of said full wave rectified pulse train so that only one said power supply circuit is drawing current from said transformer secondary at any given time.

6. A time multiplexed power supply, comprising:
   (a) a transformer having a primary winding and a secondary winding;
   (b) a full wave bridge rectifier without any filter placed across the secondary of the transformer that creates an electrical power pulse train with a frequency of twice the frequency of the primary voltage:
   (c) a plurality of direct current power supply circuits connected in parallel with said full wave rectified secondary winding;
   (d) means for time multiplexing energization of said power supply circuits from said secondary winding so that said power supply circuits share said secondary winding without simultaneously loading said transformer.

7. A power supply as recited in claim 6, wherein said time multiplexing means converts the energy from said full wave rectified electrical pulse train into multiple, independent, variable voltage direct current power supplies.

8. A power supply as recited in claim 6, wherein said time multiplexing means shares full wave rectified, sinusoidal energy pulses from said transformer secondary amongst said power supply circuits.

9. A power supply as recited in claim 6, wherein said power supply circuits draw current on specified cycles so that only one said power supply circuit is drawing current from said transformer secondary at any given time.

10. A power supply as recited in claim 6, wherein said power supply circuits draw current on specified cycles of said full wave rectified electrical pulse train so that only one said power supply circuit is drawing current from said transformer secondary at any given time.

11. An apparatus for time multiplexing a plurality of independently variable voltage direct current power supplies connected in parallel across the secondary of a transformer, comprising:
   (a) control means for allowing each said independently variable voltage power supply circuit to draw current on specified cycles so that only one said power supply circuit is drawing current from said transformer secondary at any given time;
   (b) means for creating a full wave rectified electrical pulse train from said transformer secondary and converting the energy from said full wave rectified pulse train into multiple, independent, variable voltage direct current power sources.

12. A power supply as recited in claim 11, wherein said time multiplexing means includes means for sharing full wave rectified, sinusoidal energy pulses from said transformer secondary amongst said independently variable voltage power supply circuits.

* * * * *